(12) United States Patent
Crosby et al.

(10) Patent No.: US 6,507,848 B1
(45) Date of Patent: Jan. 14, 2003

(54) EMBEDDED DYNAMIC CONTENT IN A STATIC FILE FORMAT

(75) Inventors: Matt Crosby, Vashon, WA (US); William P. Wyman, Bainbridge Island, WA (US); Grant Tegtmeier, Issaquah, WA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/281,626

(22) Filed: Mar. 30, 1999

(51) Int. Cl.[7] .............................................. G06F 17/30
(52) U.S. Cl. ........................ 707/102; 707/501; 707/513; 345/967
(58) Field of Search ................................. 707/501, 513, 707/515, 10, 2, 102; 345/333, 335, 967

(56) References Cited

U.S. PATENT DOCUMENTS

| | | | | |
|---|---|---|---|---|
| 5,524,253 A | * | 6/1996 | Pham et al. ................... | 703/27 |
| 5,619,624 A | * | 4/1997 | Schoenzeit et al. .......... | 707/104 |
| 5,625,712 A | * | 4/1997 | Schoenzeit et al. .......... | 707/104 |
| 5,826,086 A | * | 10/1998 | Arima et al. ................ | 345/967 |
| 5,930,801 A | * | 7/1999 | Falkenhainer et al. ....... | 707/103 |
| 5,987,480 A | * | 11/1999 | Donohue et al. ........... | 707/501 |
| 6,029,576 A | * | 2/2000 | Fischer et al. .............. | 707/104 |

* cited by examiner

*Primary Examiner*—Jean M. Corrielus
(74) *Attorney, Agent, or Firm*—Fish & Richardson P.C.

(57) ABSTRACT

Methods and apparatus for producing a document with dynamic content for display in either a static or dynamic environment. A method includes generating an object including defining a dynamic characteristic for the object, storing the object in a embeddable file format and authoring a document using an authoring application including embedding the object into the document and preparing the document as part of the print process for display such that when the document is displayed in a dynamic environment the dynamic appearance of the object is displayed.

48 Claims, 8 Drawing Sheets

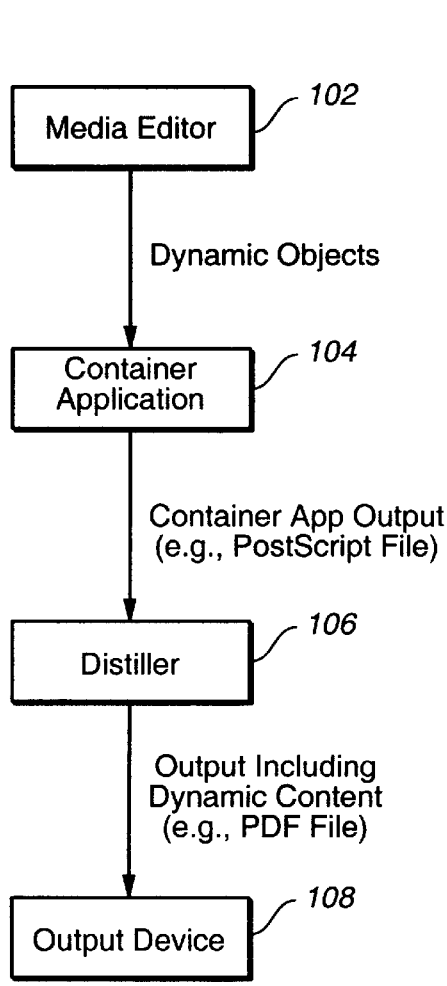
FIG._1
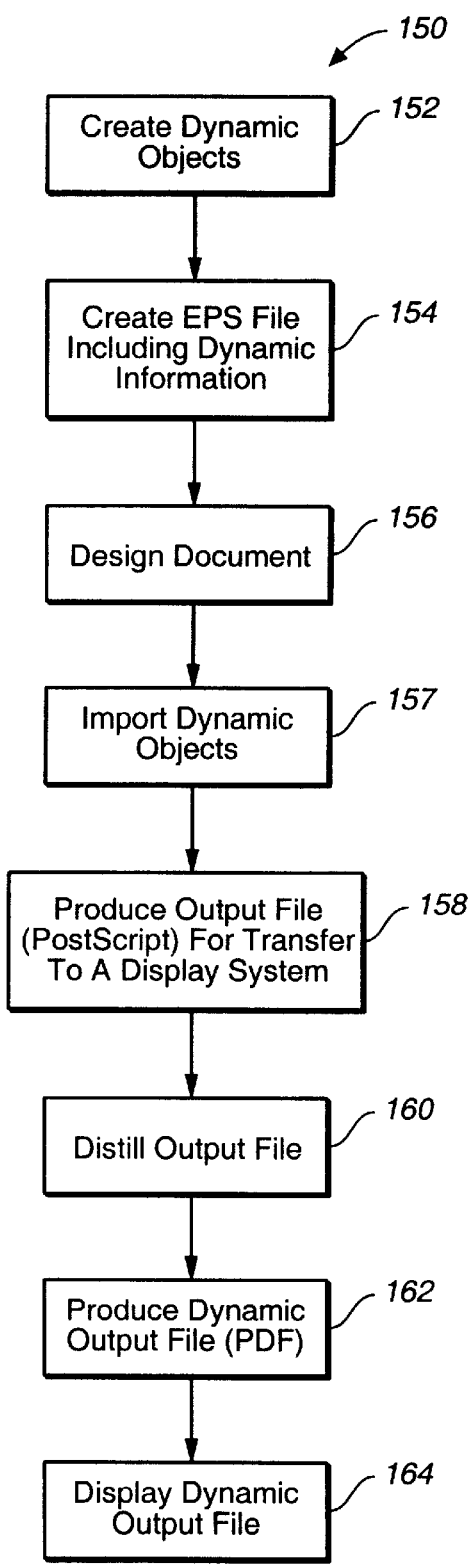
FIG._2

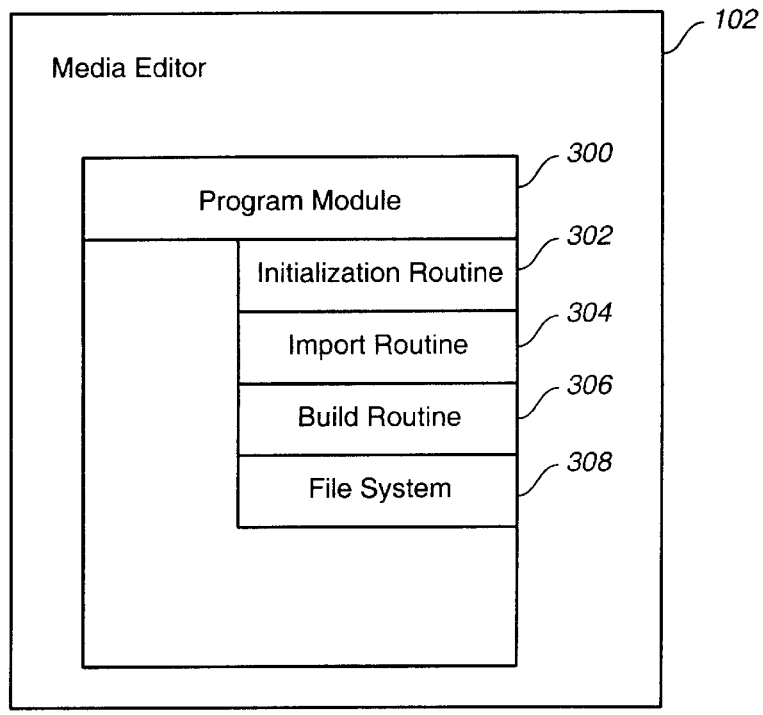
FIG._3
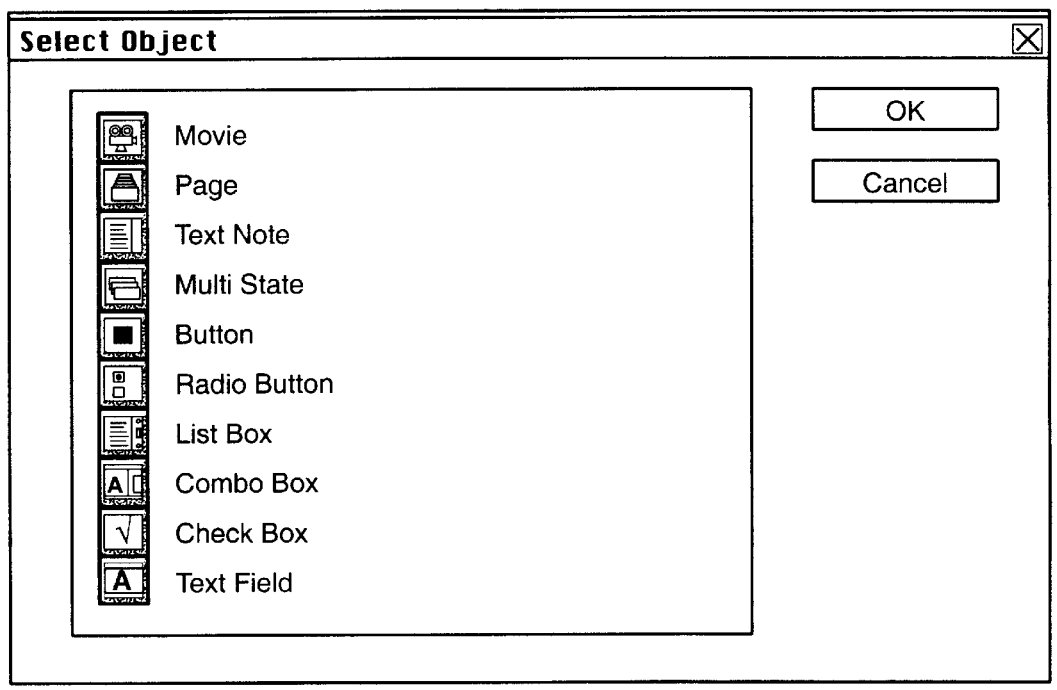
FIG._4a

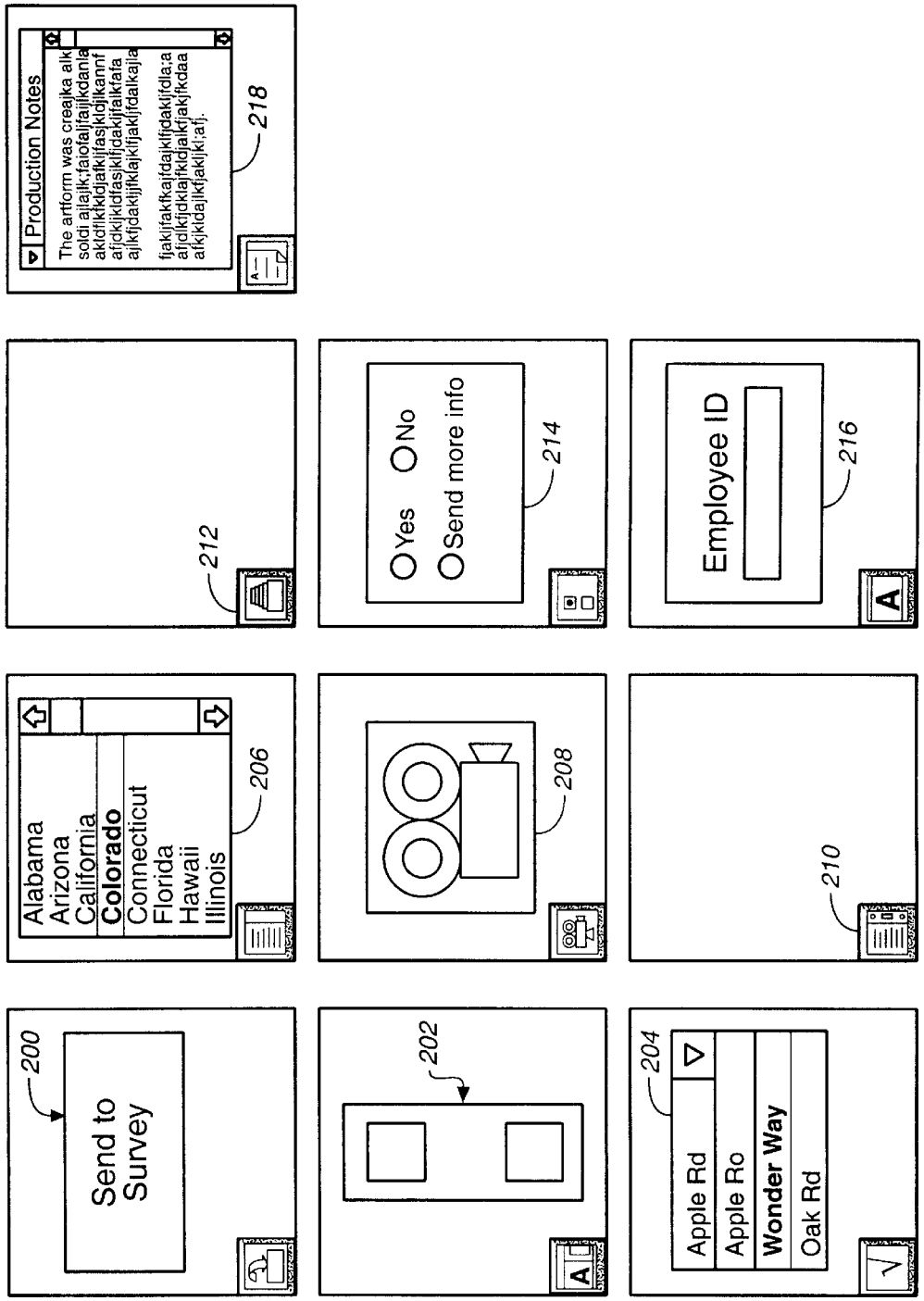
FIG._4B

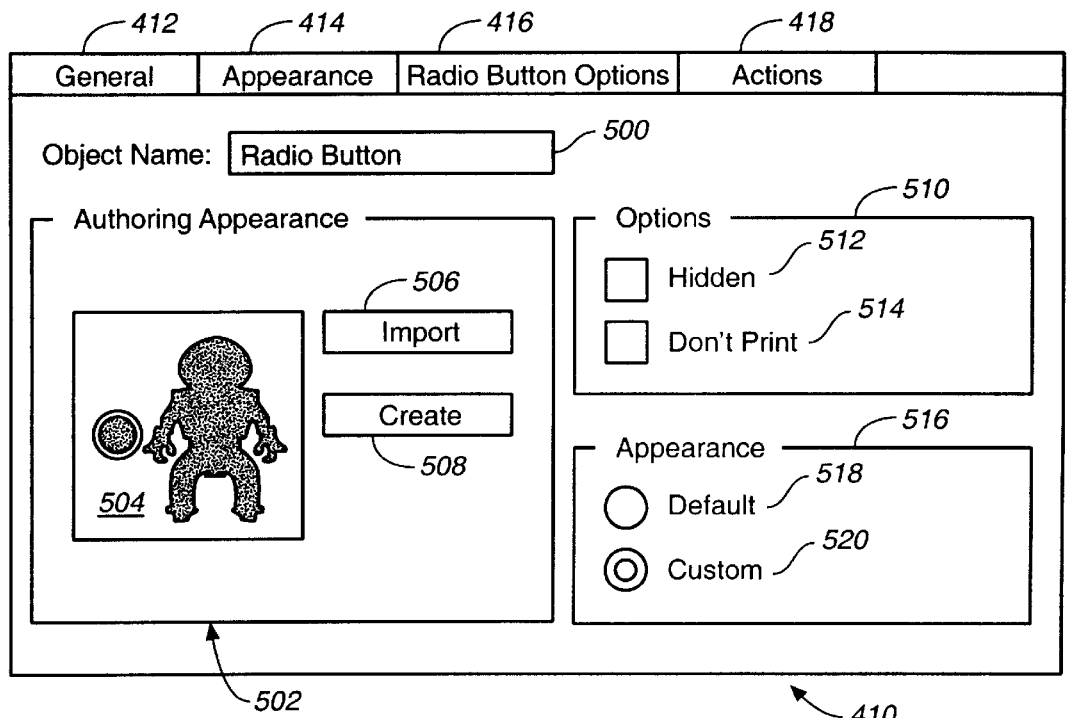
FIG._4C
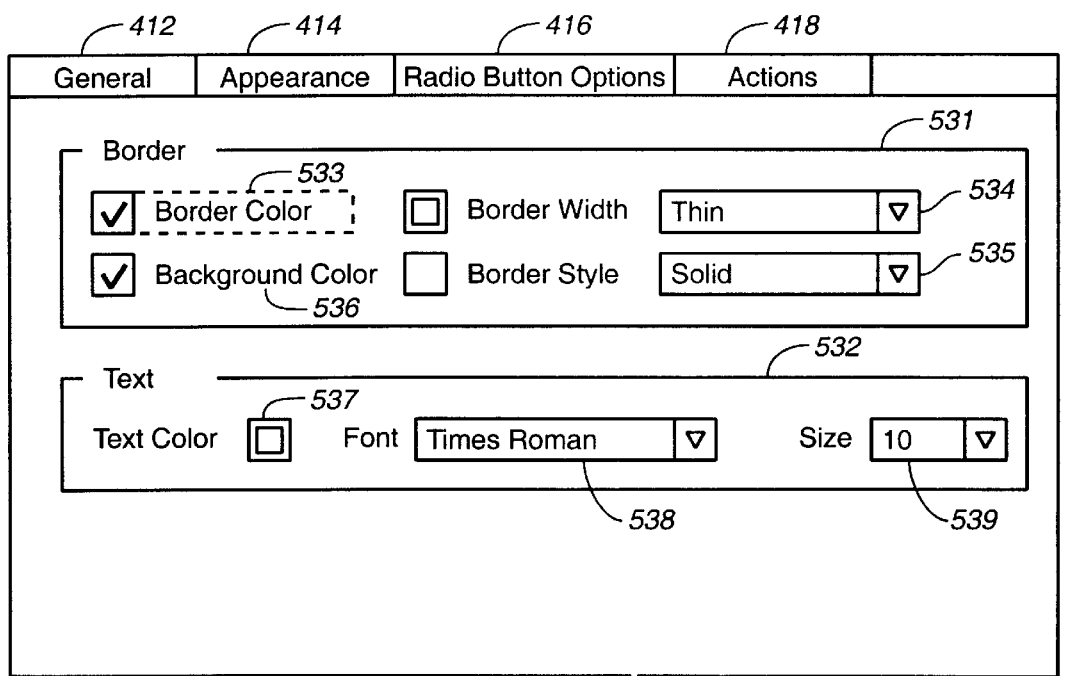
FIG._4D

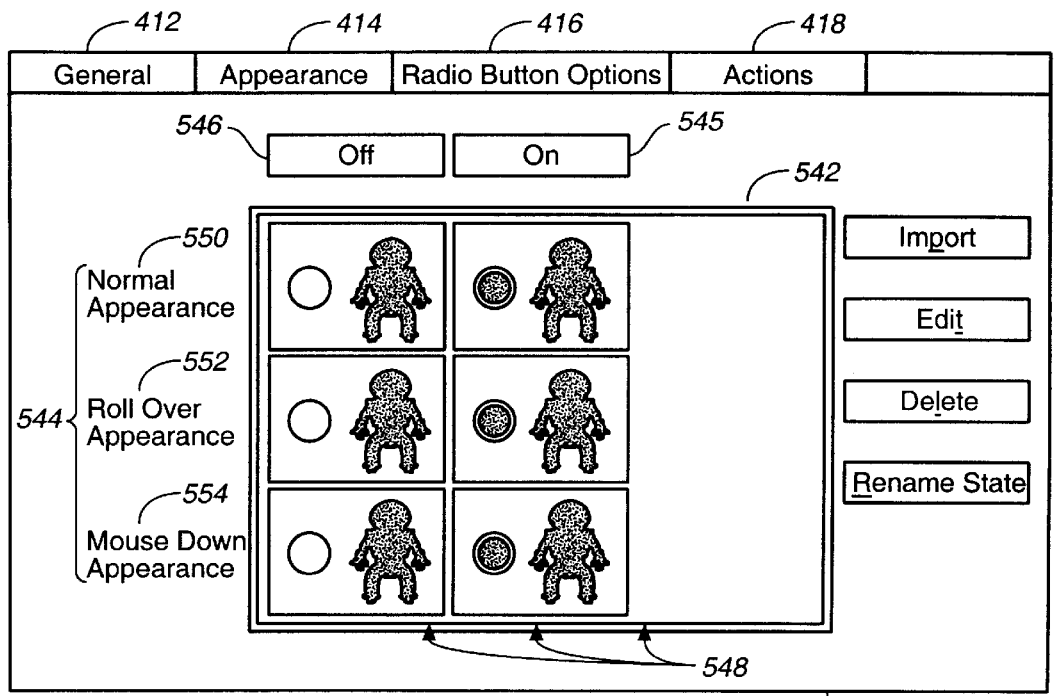
FIG._4E
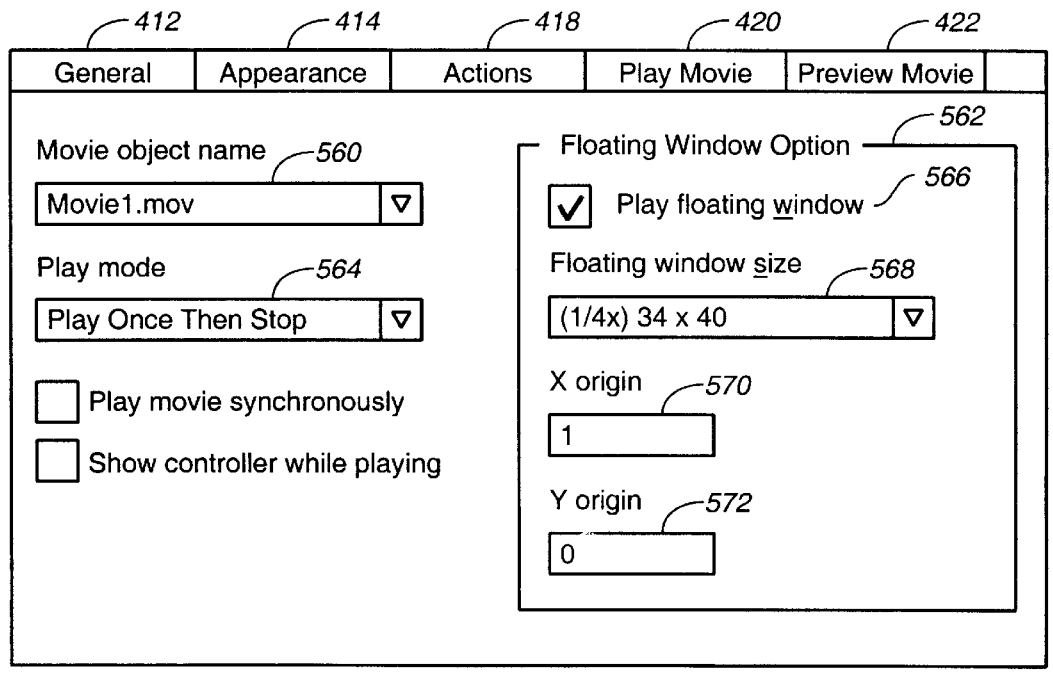
FIG._4F

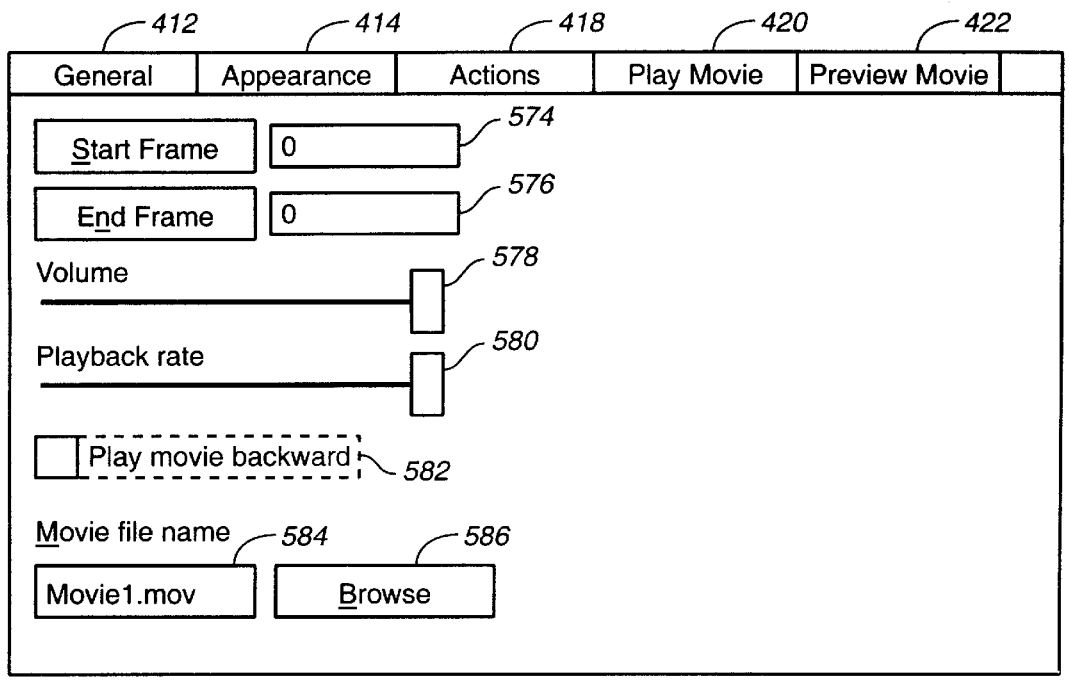
FIG._4G
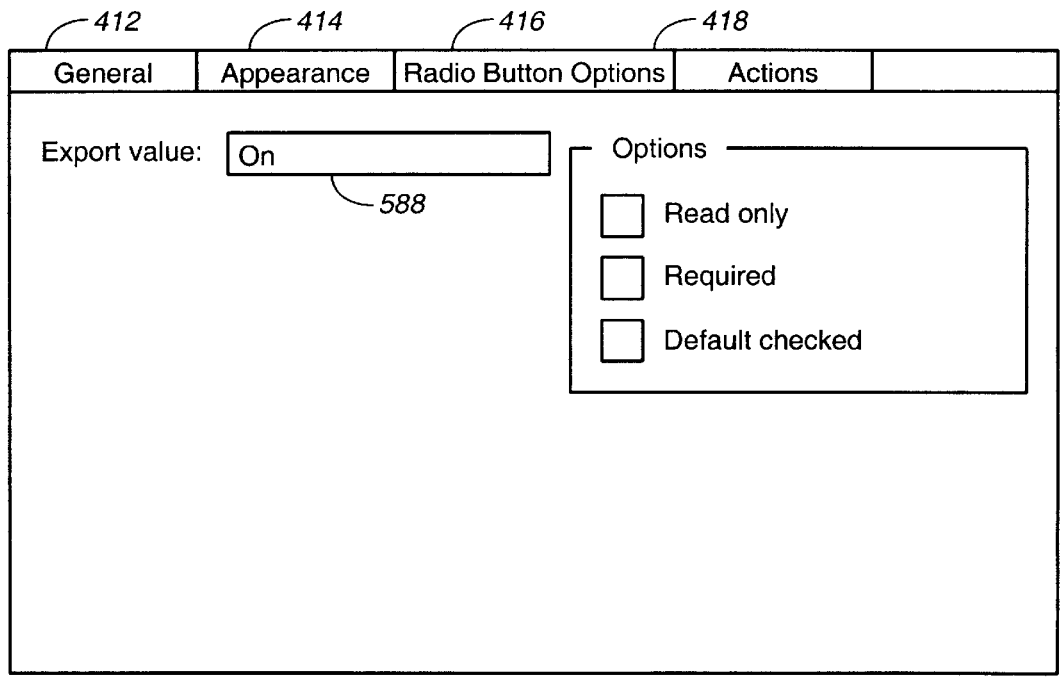
FIG._4H

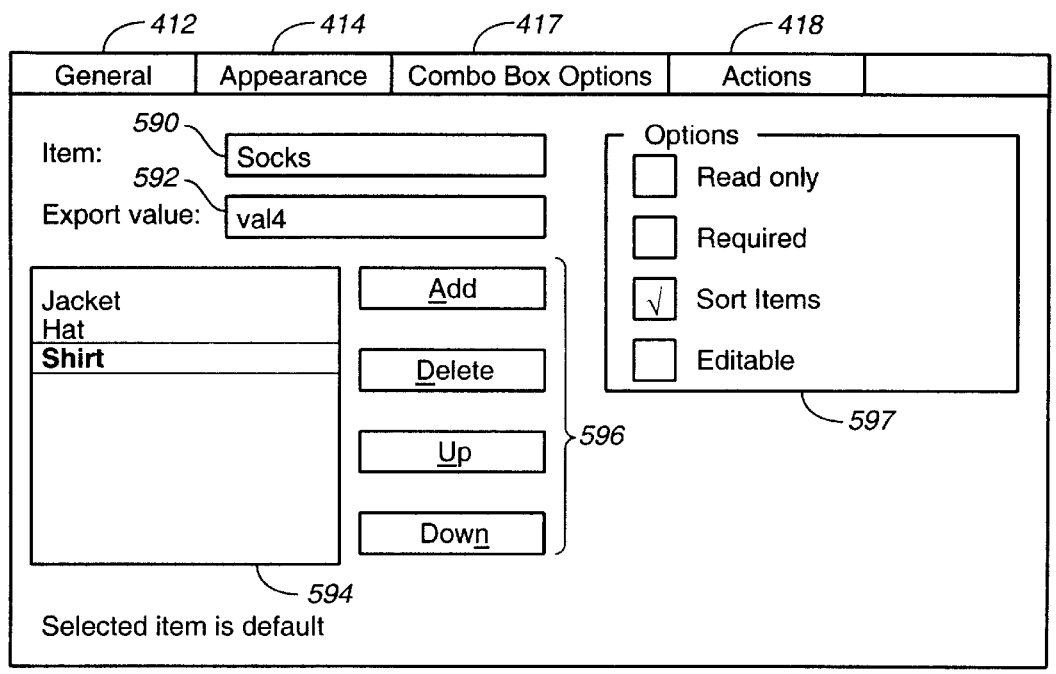
FIG._4I
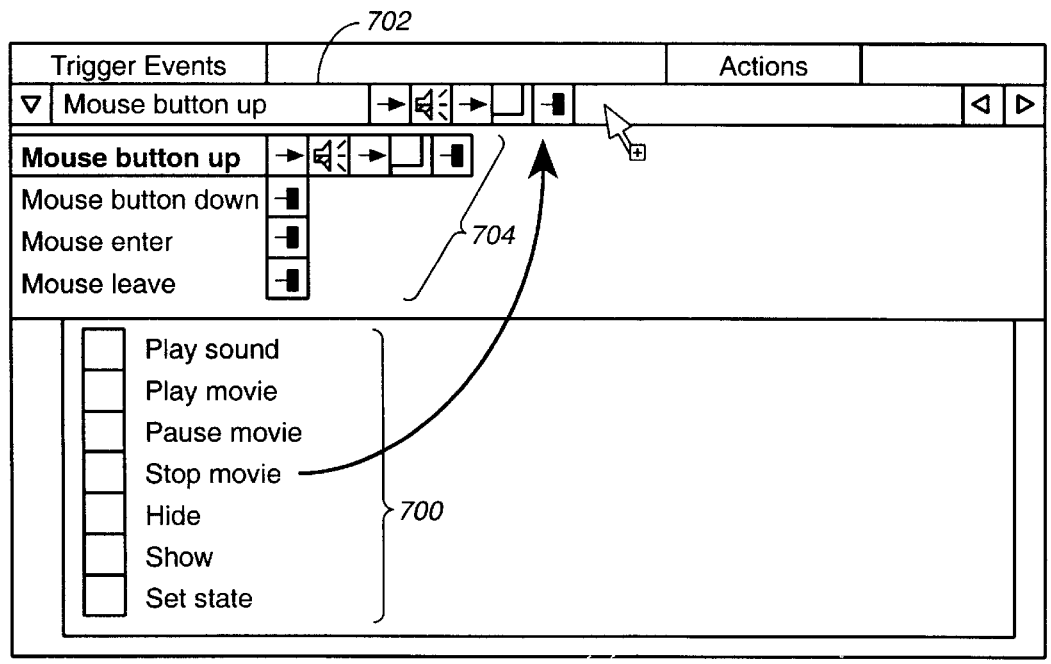
FIG._4J

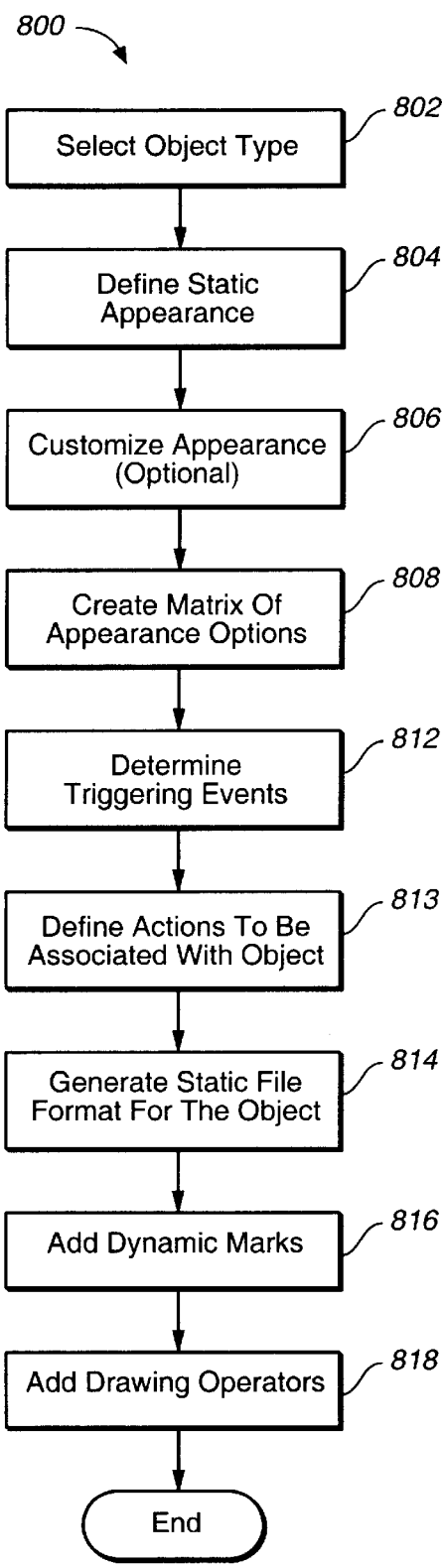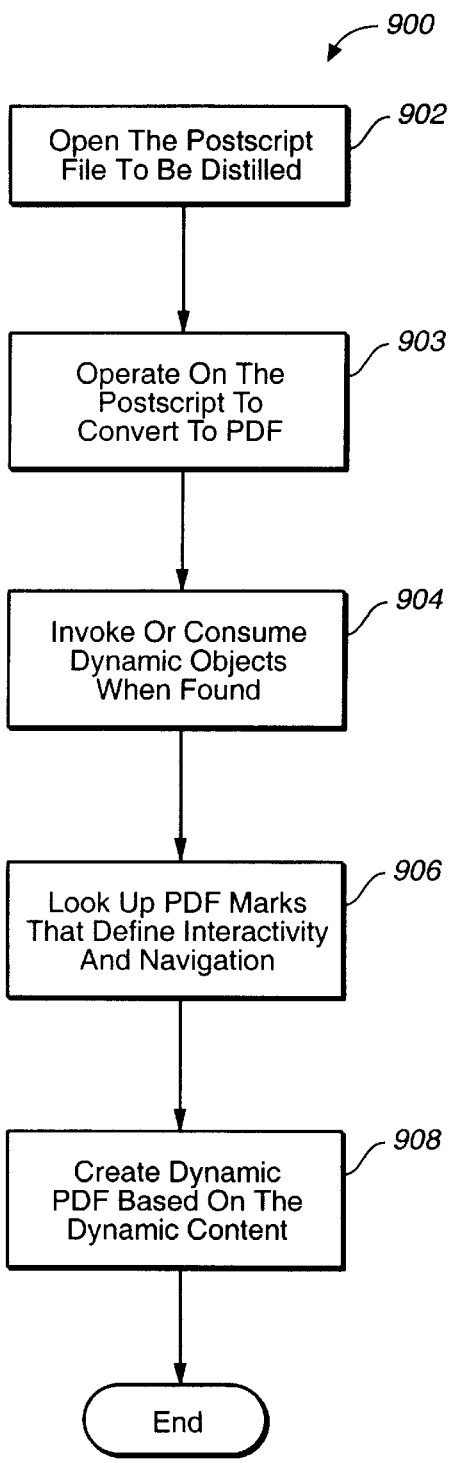
FIG._5
FIG._6

EMBEDDED DYNAMIC CONTENT IN A STATIC FILE FORMAT

The present invention relates generally to methods and systems for displaying data in a dynamic environment.

BACKGROUND

In many computer systems, it is common to represent and convey information to a user through digital images. These images can take a variety of forms such as alpha-numeric characters, graphs and other pictorial representations. The digital images can be conveyed to a user on a raster display device, video monitor, printer or the like.

The images can be produced by authoring applications. An authoring application is a computer program that allows a user to assemble and arrange content and upon completion of the assembly, print or otherwise display the end result. A container for the content is referred to as a document. An authoring application can include a word processor, drawing engine, or other tools for creating content to be presented in a document. In addition, the authoring application can include an import tool that allows for content (objects) of differing formats to be imported into a document for display along with content produced by the authoring application. Examples of authoring applications include WordPerfect, Word™ by the Microsoft Corporation, Persuasion, QuarkXpress, and Acrobat™, PageMaker™ and FrameMakert™ applications by Adobe Systems Incorporated.

A document can include static content and dynamic content. The appearance of static content is constant for all types of output devices on which the content is displayed for each viewing of the content. Accordingly, static content appears the same when printed by a printer (a static output device) or when displayed on a computer monitor (a dynamic output device). Examples of static content include text and some forms of graphics. On the other hand, the appearance of dynamic content can change when viewed in a dynamic environment, such as when displayed on an electronic media device (e.g., a computer monitor). Dynamic content can change based upon the actions of a user. For example, a button can have an initial appearance when presented on a display and can change appearance as a mouse or other pointing device is dragged across the button in a selection process. Examples of dynamic content (pieces of a document that invoke a dynamic behavior) include video, hypertext links and bookmarks.

Documents that include dynamic content are often referred to as interactive documents. The construction of an interactive document typically involves two distinct phases: a composition phase and a functional phase. The composition phase defines the content and design of a document. The functional phase provides navigation and interactivity to the static content.

In the composition phase, static content is assembled into a document using an authoring application. This can include creating static content by the authoring application as well as importing static content of varied formats from other sources. The composition phase culminates in the production of a static file format representation of the document.

In the second phase, the resultant static file produced by the authoring application can be operated on by a second authoring application (a dynamic tool) to produce an interactive document. The dynamic tool allows a user to specify actions and drawing definitions for the display of objects in a dynamic environment. The dynamic tool produces as an output a dynamic format file that can include both static content and new dynamic content which can be viewed in a dynamic environment. Examples of dynamic tools include Acrobat, by Adobe Systems Incorporated.

The operation on the static file by the dynamic tool is typically irreversible, that is, the output produced by the dynamic tool bears little or no relation to the original static format file produced by the first authoring application. Any changes to the underlying static data requires a return to the composition phase and the regeneration of a new static format file. Subsequently, the functional phase must be repeated to add dynamic elements to the new (regenerated) static format file to produce a new dynamic format file which can be displayed in a dynamic environment.

SUMMARY OF THE INVENTION

The present invention provides methods and apparatus for producing a document with dynamic content for display in either a static or dynamic environment. A method includes generating an object including defining a dynamic characteristic for the object, storing the object in a embeddable file format and authoring a document using an authoring application including embedding the object into the document and preparing the document as part of the print process for display such that when the document is displayed in a dynamic environment the dynamic appearance of the object is displayed.

Aspects of the invention include can include one or more of the following features. The generating step can include defining a static appearance for the object where the static appearance of the object is for display when the document is displayed in a static environment. The dynamic characteristic can include two or more dynamic appearances. The static appearance can be selected from one of the dynamic appearances. The dynamic characteristic can define a behavior of the object or effect other objects in the document. The dynamic characteristic can define an triggering event and one or more appearances of the object when displayed in a dynamic environment. The dynamic characteristic can define a change in state, appearance or behavior of the object.

In another aspect, the invention provides a method of displaying a document with dynamic content for display in either a static or dynamic environment. The method includes receiving a document produced by an authoring application as part of a print process. The authoring application embedding an object in the document as part of an authoring process to create the document. The object is stored in an embeddable file format and includes a dynamic characteristic for the object. The method includes initiating the display of the document on an output device. If the output display device supports dynamic content, the document is distilled to detect the dynamic appearance of the object and the dynamic appearance of the object is displayed when displaying the document on the output device.

Aspects of the invention can include one or more of the following features. The step of initiating can include converting the document into a PostScript file format. The step of distilling can include transforming the PostScript file to a PDF file format including dynamic content.

In another aspect, the invention provides a method of producing a document with dynamic content for display in either a static or dynamic environment and includes embedding an object having a dynamic characteristic in a document and producing a printable document while retaining the dynamic characteristic of the object such that when the printable document is displayed in a dynamic environment the dynamic appearance of the object is displayed.

One advantage of the present invention is that dynamic content can be embedded in a static file format to allow for the easy generation and regeneration of documents by an authoring application. Dynamic actions including navigation and interactivity can be attached to individual objects which themselves can be imported into static format file documents. Navigation and interactivity can be defined while in the authoring stage of the development of documents for display in a dynamic environment.

Dynamic behavior can be defined for a family of objects by individuals who are qualified to develop interactive elements. Those objects can then be placed within dynamic documents by the individuals who are qualified to perform visual layout tasks. Nether set of individuals is required to learn the skills and tool sets used by the other.

The appearance of interactive elements can be developed separately from their behaviors, allowing experts in both graphics arts and in computer programming to focus on their areas of expertise while collaborating on the development of dynamic content.

A standard set of dynamic objects can be defined once, and then reused across an entire document, or set of documents, to provide a consistent interactive experience and to leverage the development process.

Other advantages and features will be apparent from the following description and claims.

BRIEF DESCRIPTION OF THE DRAWING

FIG. 1 is a schematic block diagram illustrating a system for embedding and displaying dynamic content in a document.

FIG. 2 is a process for displaying dynamic content according to the invention.

FIG. 3 is a schematic block diagram illustrating the functional components of the media editor of FIG. 1.

FIGS. 4a–4j are screen shots of the graphical user interface presented by the media editor in constructing dynamic objects.

FIG. 5 is a flow diagram for a method of building dynamic objects.

FIG. 6 is a flow diagram for a method of distilling dynamic document.

DETAILED DESCRIPTION

Referring to FIG. 1, a system 100 for embedding and displaying dynamic content in a document is shown. System 100 includes a media editor 102, a container application 104, a distiller 106, and an output device 108.

Referring now to FIGS. 1 and 2, a method 150 for creating and displaying interactive documents includes creating dynamic objects (152). Media editor 102 creates objects that can be imported into documents by container application 104. Objects can be of numerous dynamic types including buttons, check boxes, text fields, combo boxes and list boxes. Each object can include a user definable appearance and action. Media editor 104 provides a static format file output for each object (154), as will be described in greater detail below. In one implementation, media editor 104 provides as an output an Encapsulated PostScript (EPS) file defining the object.

Container application 104 can be invoked by a user to create and design a static portion of an interactive document (the container application document) (156). Content definition and placement is determined by a user. Container application 104 includes a tool for importing content of differing types into the container application document. In one implementation, container application 104 is a word processor such as Word™, by Microsoft Corporation, and includes numerous tools for manipulating, editing and placing content in the container application document including a tool for importing EPS objects. Dynamic objects are imported into the container application document (157).

Container application 104 can include tools for resizing, moving or otherwise manipulating an imported object. However, typically, no tools are provided for editing content contained within a given imported object. For the purposes of container application 104, each imported object defines a bounding box which can be moved, stretched or shrunk depending on user placement. A characteristic of the imported object is that the object must survive the print process of the container application. That is, the embedded dynamic content contained within the imported object must be retained for discovery by, for example, the distiller application as described below. The dynamic content within the imported object is both identifiable and extractable after the printing process by the container application. Container application 104 produces as an output a static document file which can be transferred to an output device for display (158).

In one implementation, the output file can be of the form of a PostScript™ file, which can be interpreted by a PostScript compatible printer or other device. Each imported dynamic object can have associated zero or more dynamic appearances and one static appearance, which may or may not be one of the dynamic appearances. Objects having a defined static appearance can be printed. Dynamic objects are defined such that when they are outputted to a static device their dynamic characteristics are suppressed. The suppression is handled through the use of markers or operators that are unsupported by conventional PostScript compatible devices. The markers or operators are embedded for each dynamic object in the static format files and describe the dynamic behavior. An example of an operator that can be included in the static format file is a PDF marking operator. PDF marking operators are described in greater detail below and in the Portable Document Format (PDF) Reference Manual, version 1.3, available from Adobe Systems Incorporated. Conventional PostScript compatible printers do not support these operators resulting in the suppression of the dynamic behavior.

Distiller 106 transforms the output of container application 104 into a dynamic format for display on a dynamic output device, such as output device 108 (160). In one implementation, distiller 104 converts PostScript input files into Portable Document Format (PDF) documents. PDF documents are inherently dynamic. Embedded marks (PDF marking operators) found in objects are converted into dynamic PDF behaviors while static content of the PostScript file is converted to static PDF representations of the same content. A PostScript compatible device literally skips over the marks or operators embedded in the PostScript file which creates the dynamic behavior when the file is distilled into PDF. More specifically, distiller 104 distills a line at a time the output file produced by container application 104. The output of distiller 106 is a dynamic file and can be of the form of a PDF file.

The dynamic file output is provided as an input to output device 108 (162). Output device 108 can be of the form of a PDF reader or other electronic media display. Output device 108 displays the dynamic information contained in the dynamic output file resulting in the display of an interactive document (164).

Referring now to FIG. 3, media editor 102 can be a computer program tangibly stored on a computer readable medium including instructions for causing a computer to create dynamic objects. Media editor includes a program module 300 which includes methods and tools for constructing dynamic objects and includes an initialization routine 302, an import routine 304, a build routine 306 and file system 308.

a) Initialization Routine

Initialization routine 302 includes a method for initializing a graphical user interface to cause the display of a window including a work space, tool bar and other elements used in the construction of dynamic objects. At initialization, initialization routine 302 displays a selection menu 404 as is shown in FIG. 4a. Selection menu 404 includes a listing of the types of dynamic objects that can be constructed. In one implementation, media editor 104 includes ten types of objects: button, check box, combo box, list box, movie, multi-state, page, radio button, text field and text note. Properties of a dynamic object can include type, name, appearance, action and pointers. The object type determines the look and behavior of an object, but does not limit the actions which can be applied to a given object.

Referring now to FIG. 4b, a button 200 is an object which can be used to perform simple navigation (e.g., go to a next page) or a more complex sequence involving many actions. When triggered by a triggering event, an action associated with the button is executed resulting in an interactive presentation. A button can include a default appearance, or a custom appearance can be defined by importing or otherwise associating another file, such as an EPS file, with the button by a user.

A check box 202 is an object that includes a group of items from which a user can make a selection. A triggering event, such as the selection of one or more of the boxes, initiates a user defined action. A check box can include a default appearance having both a check box and user editable text, or can be customized in appearance by importing an EPS file which defines the appearance of the check box.

A combo box 204 includes a pop-up menu having a plurality of options, only one of which is displayed (the selected item). The appearance of a combo box in an authoring application can be imported or a default appearance can be selected. Distiller 106 can disregard the custom appearance and provide a default appearance. For example, the Acrobat Distiller will only produce a default appearance for a combo box, however a user can designate the color and size of the border and type.

A list box 206 displays a list of items any one of which can be selected by a user. The appearance of a list box can be established by default or modified by a user as discussed above with regard to a combo box.

A movie 208 is an object that upon triggering, plays a movie. The movie object includes a pointer to a movie file, and not the movie file itself. A default appearance can be specified such as a single poster fratne associated with QuickTime files or a user defined custom appearance can be specified.

A multi-state object 210 is a button that changes appearance depending on its state. The appearance can also be effected by the positioning of a pointing device relative to the multi-state object and whether the object has been selected. In one implementation, other buttons can change the state of a multi-state object. The states affect only the appearance of the button, not its associated actions.

A page 212 is an object that is invisible but controls actions when leaving or entering a page onto which the object is placed. A page object can be given an appearance in order to locate it easily in the authoring application, but results in no display when provided to an output device.

A radio button 214 includes a group of items. A user can select only one item from the group. Each item can include a different action (export value). Radio buttons are created by assigning the same name to different buttons, each having a different export value. A default appearance can be selected for the radio button without text or a custom appearance can be imported including a button and text.

A text field object 216 provides a field into which a user can type text. A default text value for the field can be specified by a user.

A text note object 218 can be opened or closed and contains a title, text and scroll bar. Text notes perform no actions. Only the content and appearance of a text note can be user configured.

b) Import Routine

Referring again to FIG. 3, import routine 304 includes methods for importing images stored on a local computer or from other remote locations. Typically, import routine 304 retrieves a custom EPS file representative of an appearance that is to be applied to one or more dynamic objects constructed in accordance with build routine 306.

Import routine 304 can generate a request for a file to be transferred from a remote location. Once identified (or requested), the page is retrieved (received) and can be stored in file system 308 until required to support build operations for a particular object. File system 308 can physically store all the files to be used in a dynamic object. Alternatively, the import routine can be invoked at build time to retrieve particular files from remote locations. File system 308 is a placeholder for files, and partial or complete dynamic objects which have been constructed with the tools disclosed herein.

c) Build Routine

Build routine 306 includes methods for creating dynamic objects. Build routine 306 includes a method for initializing a graphical user interface to cause the display of a window including an object definition window 410 in the work space as is shown in FIG. 4c. Object definition window 410 includes four sub-windows or tabs: general tab 412, appearance tab 414, object type specific options tab 416 and actions tab 418.

General Tab

At initialization, build routine 306 displays general tab 412. General tab 412 includes a nane field 500, an authoring appearance box 502 including appearance window 504 along with appearance selection options 506 and 508, a use appearance box 510 along with use appearance selections 512 and 514, and a option box 516 including display options 518 and 520.

Objects can be named by providing a name in name field 500. Named objects allow for interaction between objects. Some user definable actions can require the identification of another object. Objects are not required to be named. The name of the object may not necessarily correspond to the name of the file produced by media editor for export. Object file names are specified as part of a save function associated with a file menu in a toolbar (not shown).

Button, text note, page and movie objects can appear only once in a document unless they are unnamed or have a page local name. Form control objects (radio buttons, list boxes, combo boxes, check boxes, text fields and multi-state buttons) can share the same name with other objects of the same type. If no name is provided for an object, they can be referred to many times in a document, but cannot be referred to in an action sequence. Examples of no name objects are "next page" buttons.

Page-local names can be assigned to an object to allow for multiple copies of the object to be used in a document. In one implementation, all page local names begin with a "#" sign. Actions that apply to an object with a page-local name, only apply to the object on the current page.

Distiller 106 operates on shared named objects such that when a value or selection for one instance of the object is changed, then all instances of the object are updated to match. For example, a text field can be designated to include the social security number for a person. Instances of the object can be repeated on every page of the document. By using a shared name, changes can be incorporated across many objects in the document.

The appearance for an object, at the container application display level as well as at the final output level can be defined by designating selections in authoring application box 502 and use appearance box 510. Import selection 506 invokes import routine 304 to import a file for the appearance of the object. Appearance window 512 displays the current appearance for the object. The dynamic appearance for some objects are automatically generated in the dynamic environment (e.g., list boxes and combo boxes) using default appearances. Other object types do not have default appearances associated with them. For these types of objects (e.g., radio buttons and Multi-state buttons) to be visible in a dynamic environment, a custom appearance must be defined for the respective object. The custom appearance selection 508 defines the appearance for an object.

Some objects include a default setting for appearance or the objects can be selectively customized. A default/custom appearance choice is presented on general tab 412 to enable override of the default appearance. Use appearance selections include a custom selection 520 and default selection 518. The custom appearance can be defined in appearance tab 414.

In one implementation, multiple EPS files can be imported by the media editor 100. An initial EPS file configuration is identified that corresponds to the initial view or presentation of the object to be displayed. Thereafter, other EPS files can be imported in accordance with the user's desire to present the varying content. A second EPS file can define the display of the object when a pointing device is dragged across the object. A third EPS file can define the presentation of the object when a pointing device selects the object. A fourth EPS file can define the presentation of the object when the pointing device deselects the object.

Appearance Tab

The appearance of the object can be manipulated by making selections in appearance tab 414. Appearance tab 414 includes default window 530 and custom window 540 as is shown in FIGS. 4*d* and 4*e*. Depending on the object type and the selections made in general tab 412, one of the two appearance windows will be displayed.

Default window 530 includes border box 531 and text box 532. Border box includes selections for defining border color 533, border width 534, border style 535 and background color 536. Text box 532 includes selections for defining text color 537, font 538 and size 539.

Custom window 540 includes a custom appearance field 542 which forms a matrix representative of the appearance of the object when configured in one or more conditions 544 (on or off conditions 545 and 546) and a corresponding appearance state 548 (normal appearance state 550, roll over appearance state 552 and mouse down appearance state 554). The custom configuration for an object allows for appearance changes in response to triggering events or actions invoked by an object.

Object Type Specific Tabs

Object type specific tab 416 includes object-type-particular selections. For example, the movie object includes two tabs a play movie tab 420 and a preview movie tab 422 as is shown in FIGS. 4*f* and 4*g*. A user selectable pointer 560 indicates the particular movie file that is to be played when the movie object is triggered. Play movie tab 420 includes a floating window box 562 and play mode field 564. Floating window box 562 allows for the display of the movie in a floating window whose parameters can be user specified by floating window. selection box 566, floating window size field 568, x origin and y origin fields 570 and 572 respectively.

The floating window will appear in the location and the size specified by the parameter selections indicated above. The bounding box of a movie being played determines where the movie button appears while the movie is being played.

Preview movie tab 422 includes selections for a start frame 574, end frame 576, volume 578, playback rate 580, backward option 582 and pointer 584. Associated with pointer 584 is a browse button 586 for browsing movie files stored in file system 308.

Radio buttons include a radio button option tab 415 as is shown in FIG. 4*h*. Radio button option tab 415 includes a export value field 588 which sets the export value for each member of the set associated with a radio button.

Combo and list boxes include a combo (list) box option tab 417 which includes a item name field 590, an export value field 592, item window 594 and item list commands 596. Item field 590 indicates the name for an item which can be added to the list maintained in item window 594. Export field value field 592 indicates the particular export value to be associated with the item indicated by Item field 590. Item window 594 includes a list of all items to be included in the combo button. Item list commands 596 allow for the manipulation of items in the item list displayed in item window 594. An options field 597 is included for designating the appearance of a particular combo box.

Text note and text field objects include a text tab (not shown) that includes a text field for entering text by a user. A text tab for text notes includes selections for specifying the name of a note, the color and note content. A text tab for a text field includes selections for text content, alignment options, multi-line wrap options and character limits.

Page objects include a page option tab (not shown) that includes auto timing selection, hide page selection, page rotation and transition effects options. Auto timing defines the amount of time between transitions from one page to the next. Transition effects available include fade, wipe and other effects. A timing selection can be made to establish the duration of a given effect.

Action Tab

Referring now to FIGS. 4*j* and 4*k*, actions can be assigned along with triggering events for each object by user selectable options presented in action tab 418. Action tab 418 includes a list 700 of the available actions, a trigger field 702 and trigger list 704. All objects can include an action except text objects.

In one implementation, ten different actions are available for selection in list 700 including: hide, jump, pause movie, play movie, play sound, reset, set state, show, stop movie, and submit.

The hide action hides either all objects or a specified list of objects. The jump action jumps to the specified location in the current document, a different file or a Web page. Jump to page locations include an attribute for setting the view associated with the page to be displayed. The movie actions (play, stop, pause) can be used to control the playback of a movie file. The play sound action can be used to play a sound file at a designated volume. The show action displays the hidden objects on the page, and can be limited to only a specified list of objects.

The reset action sets the export values for specified objects to a default value. The submit action sends the export values of all the objects designated to a specified Uniform Resource Locator (URL). Finally, the set state action sets the state of all multi-state objects on a page or only those specified in a list.

A user defines an action or sequence of actions to be associated with each object by selecting actions and triggers. Specifically, a user can select a trigger from trigger list 704. The selected trigger item will be highlighted in trigger field 702. Thereafter, actions that can be triggered by the trigger event are dragged into the trigger field 702. A sequence of actions can thereby be created for each triggering event. Trigger list can be continually updated to reflect the various actions that have been selected for each trigger.

Except page and text note objects, all objects can have up to four triggering events that trigger the designated action sequence. Triggering events include mouse enter, mouse button down, mouse button up, and mouse leave. A mouse enter trigger arises when a mouse travels over an object. A mouse button trigger arises when a mouse button is pressed (button down) or released (button up) over the object. Finally, a mouse leave trigger arises when a user moves the mouse away from the object.

Referring now to FIG. 5, a method 800 for creating a dynamic object includes selecting an object type (802). After the object type is selected, a static (authoring) appearance of the object is defined (804). The appearance may be created or imported. Options associated with the appearance may be selected to customize the appearance (806). A matrix of appearance options is created (808). The matrix defines the appearances for the object when displayed in a dynamic environment. Options associated with the various objects can be set to customize the display of the object in the dynamic environment. Triggering events are determined for triggering the transition from one appearance to another when the object is displayed in the dynamic environment (812). In addition, actions to be associated with the object are defined (813).

The output of media editor 104 is a static format file. In one implementation, the output is an EPS file. A typical static file format object includes PostScript commands to allow the object to be rendered along with graphics preview instructions that allow for the display of the object in an underlying container application which supports a preview function. The EPS file format includes information for displaying the portions of the media content within the file in a static environment. When the definition of the dynamic object is complete, a static file format representative of the authoring application appearance for the object is generated (814). Thereafter, dynamics are added to the static file format creating embedded dynamic content. In one implementation, dynamic operators that define the actions and appearances of the object when displayed in a dynamic environment are stored along with the PostScript operators in the EPS file.

The addition of dynamics in the EPS file is a two-step process. First, dynamic marks that define the dynamic nature of the media are inserted into the file structure at the appropriate location (816). Thereafter, drawing operators are included that define the alternate position or the description of the object which is to be altered (818).

In one implementation, PDF marking operators are used to identify dynamic content. PDF marking operators are used when the final content is intended to be stored in a PDF format. A PDF marking operator can define what an object does. That is, if the dynamic content of the file is to include a new structure, the PDF marking operator includes an argument which identifies the new structure (e.g., the new structure is defined in a file named XXX). Since the PDF file format is PostScript compatible, the drawing operators can be written as PostScript operators that define the actual description of what the structure (File XXX in the example above) looks like in terms of the drawing commands.

Container application 104 is a document preparation application that allows for the importation of the static file format objects into application documents. Container application 104 imports the static file format objects constructed by the media editor and places them into a document for display. The container application can include tools for importing, resizing, moving, or otherwise manipulating the imported objects. However, in general, no manipulation of embedded content (dynamic objects) is performed at the container application level. Upon completion of the manipulation of an underlying document by the container application, the document can be saved in a format for display.

The output process for producing printed output from an authoring application is a two-stage process. First the authoring application generates a device independent description of the desired output in a page description language. This description is thereafter passed to an output device which includes a program for controlling a specific raster output device. The program interprets the page description language program and renders it on that device. The page description language description serves as an interchange standard for transmission and storage for printable or displayable documents. One example of a page description language is PostScript.

PostScript can include both static and dynamic media. Static media provides a fix standard of operations (sometimes called control codes) and a syntax for specifying the operations and their arguments. Static formats have been in existence since computers first used printers. Classic examples are format control codes for line printers and format effector codes in standard character sets. Historically static formats have been designed to capture the capabilities of a specific class of printing devices that have evolved to include new features as needed.

Dynamic media allows much more flexibility than a static format. The operator sets can be extensible and the exact meaning of an operator may not be known until it is actually encountered. A page described in a dynamic format is a program to be executed rather than data to be consumed. Dynamic page description languages contain elements of programming languages such as procedures, variable and control constraints.

PostScript includes a set of primitive graphic operators that can be combined to describe the appearance of a page. PostScript includes variables and allows arbitrary computations while interpreting the page description. PostScript has a rich set of programming language control structures for combining its elements.

A page description is a self contained PostScript language description of a document which is generated at one time for execution at some arbitrary later time. At the time for execution, the page description is passed to an output device. A PostScript interpreter within the output device controls the actions of the output device according to the instructions provided in the PostScript page description. The interpreter executes the page description and produces output on a printer display or other raster device. The PostScript interpreter and output device are bundled together and are treated essentially as a black box by the authoring application.

In a traditional PostScript printer model, the authoring application creates a page description. The page description is sent to a PostScript interpreter immediately or stored for transmission at some other time. The interpreter consumes a sequence of page descriptions as print jobs and produces the requested output. The output device is typically a printer, but it can be a preview window on a work station display. The PostScript interpreter is often implemented on a dedicated processor that has direct control over the raster output device.

When used in conjunction with the display, an authoring application interacts with the PostScript interpreter controlling a display or windowing system. The interaction consists of a session instead of a one way transmission of a page description. In response to user actions, the authoring application issues commands to the PostScript interpreter and sometimes reads information back from it.

A PostScript language page description generally consists of two parts: a prolog followed by a script. The prolog is a set of application-specific procedure definitions that an application can use in the execution of its script. The prolog is included as a first part of every PostScript language file generated by the application. The prolog contains definitions that match the output functions of the authoring application if the capability is supported by the PostScript language. The script is generated automatically by the authoring application program to describe the specific elements of the pages being produced. The script consists of references to PostScript operators and to procedure definitions in the prolog, together with operands and data. The script, unlike the prolog, is usually very stylized, repetitive and simple.

Many existing applications generate printable documents in one or more print file formats or in some intermediate representation. It is possible to print such documents in a device independent fashion by translating the output of the authoring application, often a PostScript format page description into a device independent format such as PDF. For example, Adobe's Distiller program translates documents from a postscript format into a PDF format.

Typically, the format for display is a PostScript format that allows for the display of the documents on a PostScript printer or other output device. The file format selected by the container application is dependent upon the output enviromnent to which the document is going to be displayed.

In one implementation, the application container saves the finished document in a PostScript format. Thereafter the postscript format file is passed to distiller 106. Distiller 106 converts the output format provided from the container application to the specific file format structure for display in a particular environment. For example, in one implementation the distiller is an Acrobat Distiller, produced by the Adobe Corporation, which converts the postscript file to a PDF format. Alternatively, other output format distillers could be utilized.

Referring now to FIG. 6, a method 900 for distilling a PostScript file that includes embedded dynamic EPS files includes opening the PostScript file (902). The distiller operates on the PostScript to convert to PDF (903). As the distiller happens upon dynamic objects found embedded within the PostScript, distiller invokes or consumes the embedded objects (904). More specifically, the distiller opens the special code extensions associated with the PDF marking operators which were created with the embedded dynamic content. PDF marks that define navigation and interactivity are looked-up (906). The distiller creates interactive PDF based on the dynamic content. The output of distiller 106 is a dynamic file and can be of the form of a PDF file as described above (908). The output of the distiller can be passed to a reader, a PDF reader for example, for viewing by a user.

The present invention has been described in terms of specific embodiments, which are illustrative of the invention and not to be construed as limiting. Other embodiments are within the scope of the following claims.

What is claimed is:

1. A method of producing a document with dynamic content for display in either a static or dynamic environment comprising:

generating an object including defining a dynamic characteristic and a static characteristic for the object;

storing the object in an embeddable file format; and authoring a document using an authoring application including embedding the object into the document and preparing the document as part of the print process for display such that when the document is displayed in a dynamic environment the dynamic characteristic of the object is displayed and when the document is displayed in a static environment the static characteristic of the object is displayed.

2. The method of claim 1 where the dynamic characteristic includes two or more dynamic appearances and where the static appearance is selected from one of the dynamic appearances.

3. The method of claim 1 where the dynamic characteristic defines a behavior of the object.

4. The method of claim 1 where the dynamic characteristic affects other objects in the document.

5. The method of claim 1 where the dynamic characteristic defines a triggering event and one or more appearances of the object when displayed in a dynamic environment.

6. The method of claim 1 where the dynamic characteristic defines a change in state, appearance or behavior of the object.

7. The method of claim 1 where embedding the object into the document includes using an operator to embed the object.

8. The method of claim 7 where the operator is a PDF marking operator.

9. A method of displaying a document with dynamic content in either a static or dynamic environment, the method comprising:

receiving a document produced by an authoring application as part of a print process, the authoring application embedding an object in the document as part of an authoring process to create the document, the object stored in an embeddable file format and including a dynamic characteristic and a static characteristic for the object;

initiating the display of the document on an output device;

if the output display device supports dynamic content, distilling the document to detect the dynamic characteristic of the object and displaying the dynamic characteristic of the object when displaying the document on the output device; and if the output display device does not support dynamic content, displaying the static characteristic of the object when displaying the document on the output device.

10. The method of claim 9 where the step of initiating includes converting the document into a PostScript file format.

11. The method of claim 10 where the step of distilling includes transforming the PostScript file to a PDF file format including dynamic content.

12. The method of claim 9 where the step of initiating includes converting the document into a page description language file format.

13. The method of claim 9 where displaying the static appearance includes not processing an operator that indicates dynamic behavior.

14. The method of claim 13 where the operator is a PDF marking operator.

15. A method of producing a document with dynamic content for display in either a static or dynamic environment comprising:

embedding an object having a dynamic characteristic and a static characteristic in a document; and producing a printable document while retaining the dynamic characteristic of the object such that when the printable document is displayed in a dynamic environment the dynamic characteristic of the object is displayed.

16. The method of claim 15 where producing a printable document while retaining the dynamic characteristic of the object includes not processing an operator that indicates the dynamic characteristic.

17. The method of claim 16 where the operator is a PDF marking operator.

18. The method of claim 15 where the dynamic characteristic includes two or more dynamic appearances and where the static appearance is selected from one of the dynamic appearance.

19. The method of claim 15 where the dynamic characteristic defines a behavior of the object.

20. The method of claim 15 where the dynamic characteristic affects other objects in the document.

21. The method of claim 15 where the dynamic characteristic defines a triggering event and one or more appearances of the object when displayed in a dynamic environment.

22. The method of claim 15 where the dynamic characteristic defines a change in state, appearance or behavior of the object.

23. A computer program product, tangibly stored on a computer-readable medium, for producing a document with dynamic content for display in either a static or dynamic environment, the program comprising instructions to:

generate an object including instructions to define a dynamic characteristic and a static characteristic for the object;

store the object in an embeddable file format; and author a document using an authoring application including instructions to embed the object into the document and prepare the document as part of the print process for display such that when the document is displayed in a dynamic environment the dynamic characteristic of the object is displayed and when the document is displayed in a static environment the static characteristic of the object is displayed.

24. The computer program product of claim 23 where the dynamic characteristic includes two or more dynamic appearances and where the static appearance is selected from one of the dynamic appearances.

25. The computer program product of claim 23 where the dynamic characteristic defines a behavior of the object.

26. The computer program product of claim 23 where the dynamic characteristic affects other objects in the document.

27. The computer program product of claim 23 where the dynamic characteristic defines an triggering event and one or more appearances of the object when displayed in a dynamic environment.

28. The computer program product of claim 23 where the dynamic characteristic defines a change in state, appearance or behavior of the object.

29. The computer program product of claim 23 where embedding the object into the document includes using an operator to embed the object.

30. The computer program product of claim 29 where the operator is a PDF marking operator.

31. A computer program product, tangibly stored on a computer-readable medium, for displaying a document with dynamic content in either a static or dynamic environment, the program comprising instructions to:

receive a document produced by an authoring application as part of a print process, the authoring application embedding an object in the document as part of an authoring process to create the document, the object stored in an embeddable file format and including a dynamic characteristic and a static characteristic for the object;

initiate the display of the document on an output device;

if the output display device supports dynamic content, distill the document to detect the dynamic characteristic of the object and display the dynamic characteristic of the object when displaying the document on the output device; and if the output display device does not support dynamic content, display the static characteristic of the object when displaying the document on the output device.

32. The computer program product of claim 31 where the instructions to initiate include converting the document into a PostScript file format.

33. The computer program product of claim 31 where the instructions to initiate include converting the document into a page description language file format.

34. The computer program product of claim 33 where the instructions to distill include transforming the PostScript file to a PDF file format including dynamic content.

35. The method of claim 33 where the operator is a PDF marking operator.

36. The computer program product of claim 31 where instructions to display the static appearance includes not processing an operator that indicates dynamic behavior.

37. A computer program product, tangibly stored on a computer-readable medium, for producing a document with dynamic content for display in either a static or dynamic environment, the program comprising instructions to:

embed an object having a dynamic characteristic in a document; and produce a printable document while retaining the dynamic characteristic of the object such that when the printable document is displayed in a dynamic environment the dynamic characteristic of the object is displayed.

38. The computer program product of claim 37 where producing a printable document while retaining the dynamic characteristic of the object includes not processing an operator that indicates dynamic behavior.

39. The method of claim 38 where the operator is a PDF marking operator.

40. The computer program product of claim 37 where the dynamic characteristic includes two or more dynamic appearances and where the static appearance is selected from one of the dynamic appearances.

41. The computer program product of claim 37 where the dynamic characteristic defines a behavior of the object.

42. The computer program product of claim 37 where the dynamic characteristic affects other objects in the document.

43. The computer program product of claim 37 where the dynamic characteristic defines a triggering event and one or more appearances of the object when displayed in a dynamic environment.

44. The computer program product of claim 37 where the dynamic characteristic defines a change in state, appearance or behavior of the object.

45. A printer configured to receive a document with dynamic content for display in either a static or dynamic environment, comprising:

an engine for receiving a document having a dynamic object embedded therein, the dynamic object having a dynamic characteristic and a static characteristic, a print engine that initiates the display of the document on an output device, and, if the output display device supports dynamic content, distills the document to detect the dynamic characteristic of the object, such that when the document is displayed in a dynamic environment the dynamic characteristic of the object is displayed and when the document is printed the static characteristic of the object is printed.

46. The method of claim 45 where the print engine initiates the display including converting the document into a page description language file format.

47. The method of claim 46 where the print engine initiates the display including converting the document into a PostScript file format.

48. The method of claim 45 where the print engine distills the document including transforming the PostScript file to a PDF file format including dynamic content.

* * * * *

UNITED STATES PATENT AND TRADEMARK OFFICE
CERTIFICATE OF CORRECTION

PATENT NO. : 6,507,848 B1
DATED : January 14, 2003
INVENTOR(S) : Matt Crosby et al.

It is certified that error appears in the above-identified patent and that said Letters Patent is hereby corrected as shown below:

Column 13,
Line 27, after "the object is displayed" insert -- and when the printable document is printed in a static environment the static characteristic of the object is displayed --
Line 37, replace "dynamic appearance" with -- dynamic appearances --.

Column 14,
Line 57, after "a dynamic characteristic" insert -- and a static characteristic --.
Line 62, after "the object is displayed" insert -- and when the printable document is printed in a static environment a static characteristic of the object is displayed --.

Signed and Sealed this

Eighth Day of July, 2003

JAMES E. ROGAN
*Director of the United States Patent and Trademark Office*